United States Patent Office 3,128,277
Patented Apr. 7, 1964

3,128,277
LOWER ALKYL-α,α-DIPHENYL-β-PIPERIDYL-2-PROPIONATES
Richard William Temple, Marlow, and Leslie Frederick Wiggins, Wargrave-on-Thames, England, assignors to Aspro-Nicholas Limited, London, England, a company of Great Britain
No Drawing.  Filed Jan. 15, 1960, Ser. No. 2,597
Claims priority, application Great Britain Jan. 19, 1959
5 Claims.  (Cl. 260—294.3)

This invention relates to new diphenyl methane derivatives, which possess strong analgesic properties, and to methods for preparing the same.

In our co-pending patent application Serial No. 845,068 there are described derivatives of diphenyl methane having the general formula:

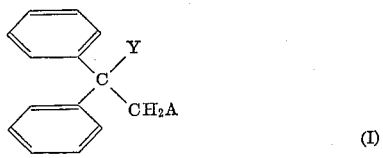

wherein Y represents a CN, CONH$_2$, COOH, COOM, COOR, COOR$_1$, COR or

group; where M is an alkali metal, R is

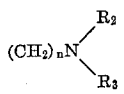

$n$ being an integer less than 4, R$_1$ is a lower alkyl group, and R$_2$ and R$_3$ are lower alkyl groups optionally substituted, which groups may form together with the nitrogen atom attached thereto a saturated heterocyclic ring optionally containing a further nitrogen atom or an oxygen atom; and wherein A represents either a 2-, 3- or 4-pyridyl group, each optionally substituted by a lower alkyl group, or, when Y represents a COOR group, a phenyl group optionally substituted by one or more chlorine or bromine atoms or alkyl or alkoxy groups containing up to 5 carbon atoms.

According to one aspect of the present invention, there are provided derivatives of diphenyl methane having the general formula:

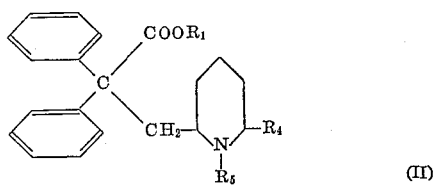

and non-toxic acid addition salts thereof, wherein R$_1$ is a lower alkyl group, R$_4$ is a hydrogen atom or a lower alkyl group, and R$_5$ is a hydrogen atom or a methyl group. The term "lower alkyl group" is used as meaning an alkyl group containing from one to four carbon atoms inclusive.

According to another aspect of the invention, there are provided methods for preparing the compounds having the general Formula II above.

When R$_4$ and R$_5$ are both hydrogen, the compounds are prepared and handled as their salts, since the free bases are unstable and cyclise immediately. However, when R$_4$ is a lower alkyl group, the free bases are stable and may be converted to the salts of any therapeutically acceptable non-toxic acid.

Compounds having the general Formula II in which R$_5$ is a hydrogen atom may be prepared by the reduction of compounds having the general formula:

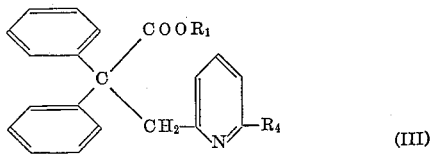

wherein R$_1$ and R$_4$ have the meanings previously defined. Compounds having the general Formula III and their method of preparation are described in our previously mentioned copending patent application. The reduction of compounds of the general Formula III may be carried out in dry methanol or ethanol by reacting the compound in the form of a salt, preferably the hydrochloride, with hydrogen in the presence of Adams' platinum catalyst at a temperature in the range of from 20°–50° C. and at a pressure of from one to ten atmospheres. The reduced compounds are advantageously isolated as their non-toxic acid addition salts, preferably the hydrochloride, since when R$_4$ is a hydrogen atom the free bases cyclise immediately.

To obtain compounds of the general Formula II when R$_5$ is a methyl group, the reduced compounds prepared in the above manner may be methylated, either by methylation of an ethanolic solution of a salt thereof, preferably the hydrochloride, in the presence of formaldehyde using Adams' platinum catalyst and hydrogen, or more advantageously by heating an aqueous solution of the salt, preferably the hydrochloride, with formic acid, formaldehyde and sodium formate. The resulting N-methyl compounds are obtained as the free base, which may be converted to the corresponding salt of any therapeutically acceptable non-toxic acid.

The following non-limitative examples illustrate the invention.

Example 1

Methyl 1:1-diphenyl-2-(2'-pyridyl) propionate hydrochloride (19.6 g.) was dissolved in dry methanol (80 mls.) and was then shaken with hydrogen and Adams' platinum catalyst at atmospheric pressure and room temperature until hydrogen uptake ceased. The catalyst was filtered off and the methanol was distilled off. The residual syrup was dissolved in acetone and ether was added until crystallisation commenced. Methyl 1:1-diphenyl-2-(2'-piperidinyl) propionate hydrochloride crystallised as colourless prisms of melting point 195–198° C. (d), which was raised to 200–201° C. by further crystallisation from an acetone-ether mixture. The free base is unstable and cyclises immediately.

Example 2

Methyl 1:1-diphenyl-2-(2'-piperidinyl) propionate hydrochloride (4.4 g.), water (5 mls.), formic acid (1.0 ml.), sodium formate (1.3 g.) and aqueous formaldehyde (40%, 1.6 mls.) were heated together under reflux for seven hours. After cooling, the solution was basified with 5 N sodium hydroxide and the precipitated oil was extracted with ether. The ether solution was extracted with normal hydrochloric acid three times. The combined extracts were washed twice with ether then basified with sodium hydroxide solution. The precipitated oil was scratched until it crystallised and was then collected and washed with water. Recrystallisation from methanol gave methyl 1:1-diphenyl-2-(2'-(1'-methyl piperidinyl)) propionate as prisms, having a melting point of 126–128° C. The hydrochloride, formed in ether, had a melting point of 168–170° C. (d) after crystallisation from a mixture of methanol and ether.

Example 3

Methyl 1:1-diphenyl-2-(2'-(6'-methyl pyridyl)) propionate hydrochloride (7.0 g.) dissolved in dry methanol (80 mls.) was shaken with hydrogen and Adams' platinum catalyst at atmospheric pressure and room temperature for five hours, when hydrogen uptake ceased. The catalyst was removed by filtration and most of the methanol was distilled off. Addition of ether to the solution gave a voluminous precipitate of small white needles which were recrystallised from methanol-ether to give methyl 1:1-diphenyl-2-(2'-(6'-methyl piperidinyl)) propionate hydrochloride of melting point 226–227° C. (d).

Example 4

Ethyl 1:1-diphenyl-2-(2'-pyridyl) propionate hydrochloride (7.0 g.) was dissolved in dry ethanol (120 mls.) by warming and was shaken with hydrogen and Adams' platinum catalyst at atmospheric pressure. After one hour some precipitation occurred so the solution was warmed to 50°, when the precipitate redissolved, and hydrogenation was continued. After six hours the theoretical amount of hydrogen had been taken up and absorption ceased. The catalyst was filtered off and most of the ethanol was distilled off. Addition of acetone and then ether gave ethyl 1:1-diphenyl-2-(2'-piperidinyl) propionated hydrochloride, melting point 170–173° C. which was raised to 173–174.5° C. by crystallisation from an ethanol-ether mixture. The free base is unstable and cyclises immediately.

Example 5

Ethyl 1:1-diphenyl 2-(2'-(6'-methyl pyridyl)) propionate hydrochloride (7.0 g.) in dry ethanol (100 mls.) was shaken with hydrogen and Adams' platinum catalyst at atmospheric pressure and room temperature. The reduction was complete in five hours. After filtering off the catalyst, most of the ethanol was distilled off and ether was added. Ethyl 1:1-diphenyl-2-(2-(6-methyl piperidinyl)) propionate hydrochloride crystallised out; this compound when recrystallised from an ethanol-ether mixture had a melting point of 216–218° C. (d).

Example 6

Ethyl 1:1-diphenyl-2-(2'-piperidinyl) propionate hydrochloride (3.4 g.), water (5 mls.), formic acid (0.8 ml.), sodium formate (1.0 g.) and aqueous formaldehyde (40%, 1.2 mls.) were refluxed together for five hours. After cooling, the solution was made strongly basic with 5 N sodium hydroxide and the precipitated oil was extracted with ether. The ether solution was extracted with normal hydrochloric acid three times, and then the combined acid extracts were washed twice with ether and basified with sodium hydroxide solution. The precipitated oil solidified on scratching and was collected, washed with water, dried, and recrystallised from petroleum ether (B.P. 60–80° C.) to give colourless prisms of ethyl 1:1-diphenyl-2-(2'-(1'-methyl piperidinyl)) propionate, having a melting point of 74–76° C.

The hydrochloride, formed in ether, had a melting point of 138–141° C. after crystallisation from a mixture of ethanol and ether.

We claim:

1. A compound selected from the group consisting of compounds having the formula:

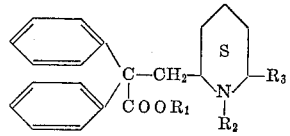

wherein $R_1$ is lower alkyl, $R_2$ is selected from the group consisting of hydrogen and methyl, and $R_3$ is selected from the group consisting of hydrogen and lower alkyl; and pharmacologically acceptable acid addition salts thereof.

2. A compound in accordance with claim 1 wherein $R_2$ and $R_3$ are each hydrogen.

3. A compound in accordance with claim 2 wherein $R_1$ is methyl.

4. A compound in accordance with claim 2 wherein $R_1$ is ethyl.

5. A process for preparing a compound of the formula:

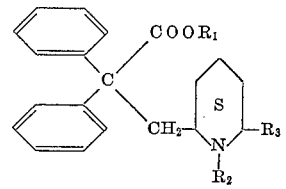

wherein $R_1$ is lower alkyl, $R_3$ is a radical selected from the group consisting of hydrogen and lower alkyl, and $R_2$ is methyl, which process comprises heating with formic acid, formaldehyde and sodium formate an aqueous solution of salt of a compound of the formula defined in claim 1, wherein $R_1$ is lower alkyl, $R_3$ is a radical selected from the group consisting of hydrogen and lower alkyl, and $R_2$ is a hydrogen.

References Cited in the file of this patent

UNITED STATES PATENTS

| | | |
|---|---|---|
| 2,649,455 | Walter et al. | Aug. 18, 1953 |
| 2,713,050 | Walter et al. | July 12, 1955 |
| 2,713,051 | Walter et al. | July 12, 1955 |
| 2,742,397 | Ott | Apr. 17, 1956 |
| 2,799,679 | Eckenstam et al. | July 16, 1957 |
| 2,855,342 | Wagner et al. | Oct. 7, 1958 |
| 2,976,291 | Jacob et al. | Mar. 21, 1961 |

FOREIGN PATENTS

| | | |
|---|---|---|
| 775,376 | Great Britain | May 22, 1957 |

OTHER REFERENCES

Richter's Organic Chemistry, volume 3, pages 3 to 4 (1923), P. Blakiston's Son and Co.

Zaugg et al.: "J. Am. Chem. Society," volume 75, page 291 (1953).

Biel et al.: "J. Am. Chem. Society," volume 77, page 2251 (1955).